(12) United States Patent
Leppanen et al.

(10) Patent No.: US 9,798,586 B2
(45) Date of Patent: Oct. 24, 2017

(54) METHOD AND APPARATUS FOR PROVIDING MASHUP SERVICE OF COMPONENT SERVICES

(71) Applicant: Nokia Technologies Oy, Espoo (FI)

(72) Inventors: Tapani Antero Leppanen, Tampere (FI); Timo Tapani Aaltonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 384 days.

(21) Appl. No.: 13/646,794

(22) Filed: Oct. 8, 2012

(65) Prior Publication Data

US 2014/0101222 A1 Apr. 10, 2014

(51) Int. Cl.
G06F 15/16 (2006.01)
G06F 9/50 (2006.01)
H04L 29/08 (2006.01)

(52) U.S. Cl.
CPC ............ G06F 9/5055 (2013.01); H04L 67/16 (2013.01); *G06F 2209/502* (2013.01)

(58) Field of Classification Search
CPC .......................... G06F 2209/502; G06F 9/5055
USPC ........................................................ 709/202
See application file for complete search history.

(56) References Cited

U.S. PATENT DOCUMENTS

| 2006/0242259 | A1 | 10/2006 | Vallabh et al. | |
| 2010/0222102 | A1* | 9/2010 | Rodriguez | G06Q 30/02 455/557 |
| 2011/0113470 | A1* | 5/2011 | Ma | G06F 17/30861 726/1 |
| 2011/0138354 | A1* | 6/2011 | Hertenstein et al. | 717/115 |
| 2011/0161833 | A1* | 6/2011 | Dheap et al. | 715/753 |
| 2014/0141767 | A1* | 5/2014 | Sharma | H04W 24/04 455/423 |

FOREIGN PATENT DOCUMENTS

WO WO-2006/116368 A2 11/2006
WO 2010/090946 A1 8/2010

OTHER PUBLICATIONS

Notification of Transmittal of the International Search Report and The Written Opinion of The International Searching Authority, or The Declaration; International Search Report; Written Opinion for corresponding Application No. PCT/FI2013/050938, dated Jan. 8, 2014, 17 pages.
Mikkonen et al., "Implementing Mobile Mashware Architecture: Downloadable Components as On-Demand Services," Procedia Computer Science, vol. 10, 2012, pp. 553-560.

(Continued)

Primary Examiner — Hitesh Patel
(74) Attorney, Agent, or Firm — Alston & Bird LLP

(57) ABSTRACT

An approach for providing mashup service of component services is described. A mashup service platform determines one or more component services available to at least one device. The mashup service platform also determines at least one mashup service based, at least in part, on a combination of the one or more component services. The mashup service platform further cause, at least in part, a generation of at least one mashup agent for interfacing with the at least one mashup service, the one or more component services, or a combination thereof.

13 Claims, 16 Drawing Sheets

(56) References Cited

OTHER PUBLICATIONS

Raatikainen et al., "Mobile Content as a Service: A Blueprint for a Vendor-Neutral Cloud of Mobile Devices," IEEE Software, vol. 29, Iss. 4, Jul./Aug. 2012, pp. 28-32.

Office Action from Chinese Patent Application No. 201380052182.0 dated Sep. 12, 2016.

Heredia, Edwin. "An Overview of the DLNA Architecture Introduction to DLNA." Microsoft Rally Technologies Presentation, Redmond, Washington, 2008. 22 Pages. Retrieved from the Internet Jun. 23, 2016: <http://download.microsoft.com/download/f/0/5/f05a42ce-575b-4c60-82d6-208d3754b2d6/DLNA_Part_1_RS08.pptx>.

"UPnP (TM) Device Architecture 1.1", Oct. 14, 2008 (Oct. 15, 2008), pp. 1-136, XP055089928, Retrieved from the Internet Jun. 23, 2016: <http://upnp.org/specs/arch/UPnP-arch-DeviceArchitecture-v1.1.pdf>.

Extended European Search Report for European Patent Application No. 13845735.3 dated May 30, 2016, 8 pages.

Office Action for Chinese Application No. 201380052182.0 dated Apr. 19, 2017.

\* cited by examiner

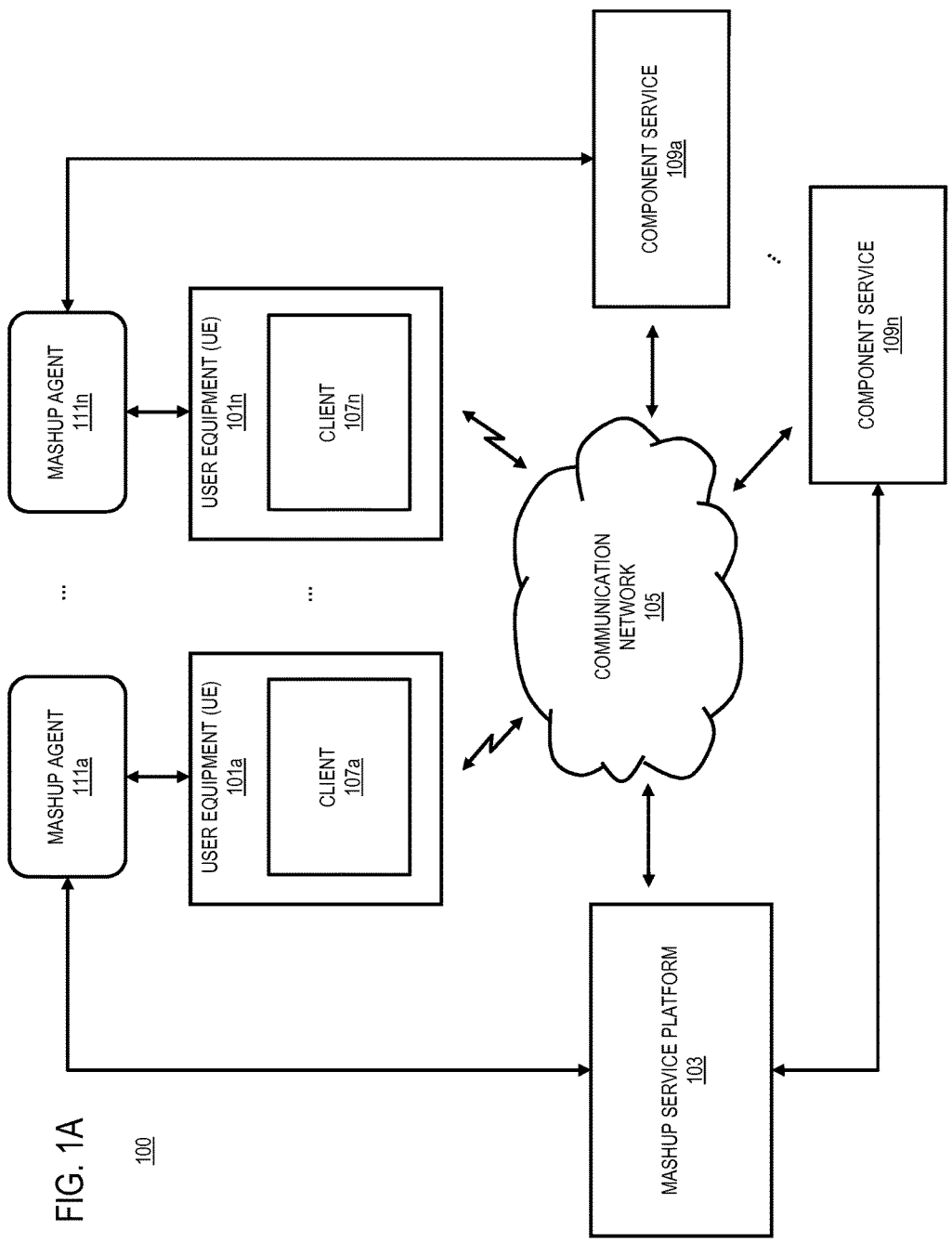

METHOD AND APPARATUS FOR PROVIDING MASHUP SERVICE OF COMPONENT SERVICES

BACKGROUND

Service providers and device manufacturers (e.g., wireless, cellular, etc.) are continually challenged to deliver value and convenience to consumers by, for example, providing compelling network services. As a result, consumers now have access to various services or devices that provides unique services online or offline. However, in many cases the available services and devices often work in isolation because each service or device typically provides different service and uses different connectivity techniques. Thus, interoperation between the devices or services is very limited. As a result, the service providers and device manufacturers face significant challenges to provide a sophisticated service facilitating interoperation between the individual devices and services.

Some Example Embodiments

Therefore, there is a need for an approach for providing mashup service of component services in a way that facilitates interoperation between the individual devices and services that are local or web-based.

According to one embodiment, a method comprises determining one or more component services available to at least one device. The method also comprises determining at least one mashup service based, at least in part, on a combination of the one or more component services. The method further comprises causing, at least in part, a generation of at least one mashup agent for interfacing with the at least one mashup service, the one or more component services, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine one or more component services available to at least one device. The apparatus is also caused to determine at least one mashup service based, at least in part, on a combination of the one or more component services. The apparatus is further caused to cause, at least in part, a generation of at least one mashup agent for interfacing with the at least one mashup service, the one or more component services, or a combination thereof.

According to another embodiment, a computer-readable storage medium carries one or more sequences of one or more instructions which, when executed by one or more processors, cause, at least in part, an apparatus to determine one or more component services available to at least one device. The apparatus is also caused to determine at least one mashup service based, at least in part, on a combination of the one or more component services. The apparatus is further caused to cause, at least in part, a generation of at least one mashup agent for interfacing with the at least one mashup service, the one or more component services, or a combination thereof.

According to another embodiment, an apparatus comprises means for determining one or more component services available to at least one device. The apparatus also comprises means for determining at least one mashup service based, at least in part, on a combination of the one or more component services. The apparatus further comprises means for causing, at least in part, a generation of at least one mashup agent for interfacing with the at least one mashup service, the one or more component services, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method disclosed herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system capable of providing mashup service of component services, according to one embodiment;

DESCRIPTION OF SOME EMBODIMENTS

Figure 1B:
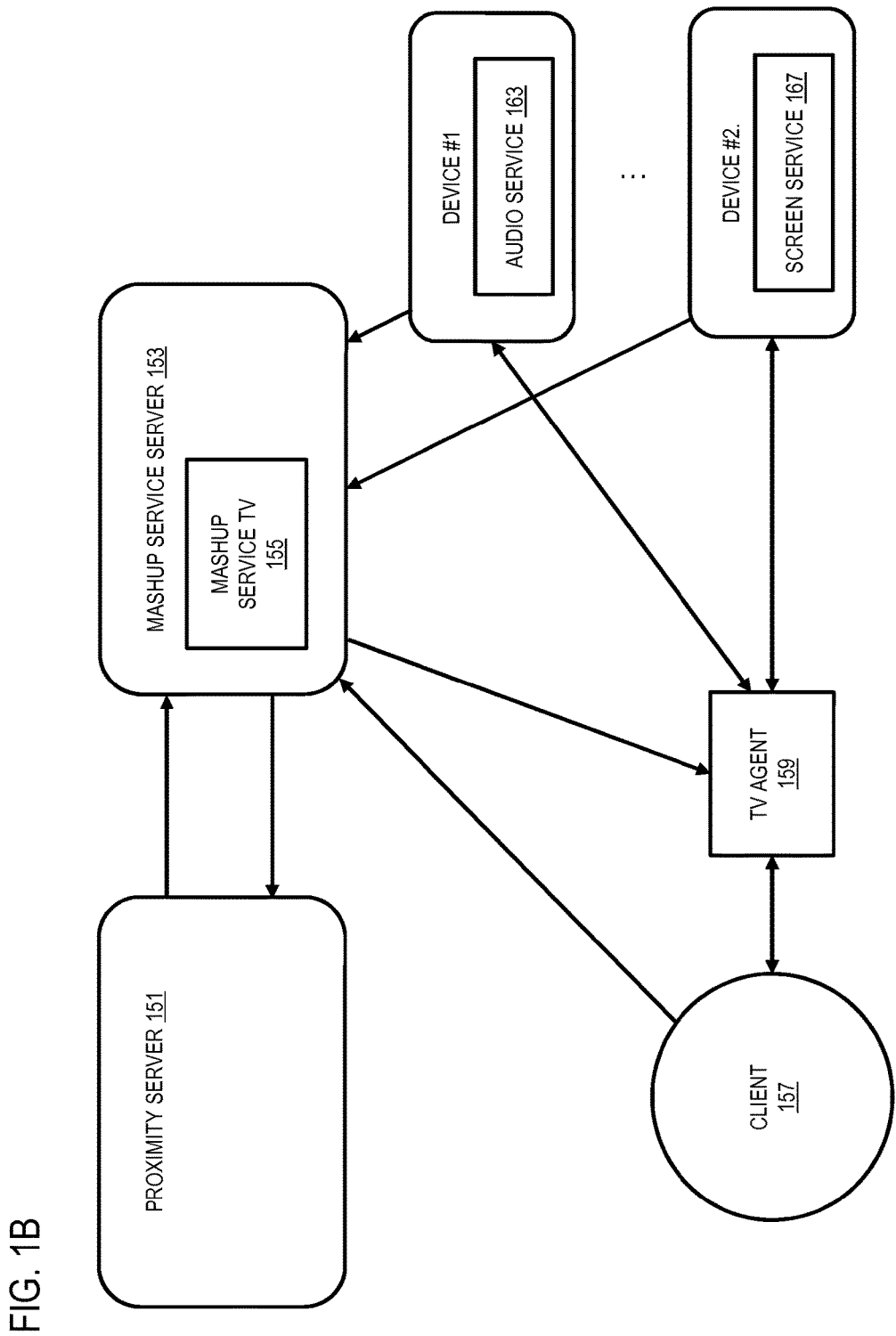
FIG. 1B is a diagram illustrating a specific example of the system in FIG. 1A, according to one embodiment.

Examples of a method, apparatus, and computer program for providing mashup service of component services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1A is a diagram of a system capable of providing mashup service of component services, according to one embodiment. Various devices and services are available around users and the users have access to the individual services and devices. However, in many cases the available services and devices often work in isolation because each service or device is typically provide different service and uses different connectivity techniques. For example, a jukebox at a restaurant plays music, and a server in a remote server room stores music files. There is no connection between the jukebox and the server. Thus, the jukebox cannot play the music from the server. Thus, interoperation between the devices or services is very limited. As a result, the service providers and device manufacturers face significant challenges to provide a sophisticated service facilitating interoperation between the individual devices and services. Moreover, some web-based mashup services are available online but those services rely heavily on the internet for connecting to the component services and providing the mashup services. In addition, existing mashup services are not designed for controlling or orchestrating individual local service components to create a local mashup service. The existing mashup services are limited to combining the web-based services only.

To address this problem, a system 100 of FIG. 1A introduces the capability to provide mashup service of component services. The mashup service uses data or services from two or more sources (e.g., component services) to provide new service. The component services may be web-based services (e.g., mapping services, video streaming services, encyclopedia service, etc.) or local services (e.g., video screening on TV, audio playing on speakers, data storing on servers, keyboard inputting, etc.). A combination of the component services enables sophisticated services for user.

In one embodiment, the system 100 may enable determining local component services in proximity to the user device. By way of an example, the local component services may be registered with a server which maintains proximity information. Thus, the proximity of the local components may be determined based on the proximity information. Otherwise, the local component services can be discovered through available wireless connections (e.g., Cellular, GPS, Bluetooth, WiFi, short-range radio, etc.). Each local component services may have different connectivity technique. Local component services without the internet connectivity may be connected to the mashup service through the devices that have internet connectivity as well as local connectivity technique (e.g., Bluetooth, WiFi, short-range radio, etc.).

In one embodiment, the system 100 may enable determining mashup services based on the combination of the local component services. By way of an example, the mashup service may be selected from the available mashup services or generated based on the available component services. The component services may be selected based on specifications, proximity information, connectivity information, parameters, etc. Compatibility between the component services and the mashup service may be determined to provide reliable mashup service. The interfaces and software for each component services may be shared to create one common interface and software.

In one embodiment, the system 100 may enable generating of mashup agents for the mashup services. By way of an example, the mashup agents can be generated to facilitate operation of the mashup service and control of the component services. The mashup agent may contain the common interface and software which enables uniformity in the operation of the mashup service and the control of the component services. The mashup agent may be in form of an application downloadable or installable into client devices.

As shown in FIG. 1A, the system 100 comprises a user equipment (UE) 101 having connectivity to a mashup service platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The mashup service platform 103 may comprise one or more servers which process data and communicate with other components of the system 100 to provide mashup services. In one embodiment, the mashup service platform may include a proximity server which determines proximity information between the UE 101 and component services 109 or other devices providing the component services 109. The proximity information of the component services 109 may be registered with the proximity server or discovered through local wireless connections (e.g., WiFi, Bluetooth, short-range radio, etc.). The registration may involve storing in a server registration information including proximity information, connectivity information, service interface specifications, other functional and non-functional specifications, parameters, etc. for using the component services.

In one embodiment, the mashup service platform 103 may also include a mashup service server which determines the mashup services and generates mashup agents 111 for the mashup services. The registration information may be used for searching the mashup services. When a search request is made by the UE 101, the mashup service server replies with the mashup agent 111 if the mashup service is available to the UE 101.

In one embodiment, the mashup agent 111 may include software logic for combining the component services into the mashup service, a common user interface for the mashup service, and information about how to use the component services 109. The mashup agent 111 may be web applications installed in servers or mobile applications in client 107 downloadable or installed into the UE 101.

In one embodiment, the component services 109 may include web-based services or local services. The web-based services can be video streaming services, mapping services, encyclopedia services, etc. The local services may be screening services, audio services, storage services, input services, etc. which are in the proximity to the UE 101. The web-based services may require internet connections. A plurality of the component services may be available to one or more devices.

In one embodiment, the mashup service platform 103, the component services 109, and/or the UEs 101 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

By way of example, the UE 101, the mashup service platform 103, the clients 107 the component service 109, and the mashup agent 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the mashup service platform 103 and the clients 107 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

FIG. 1B is a diagram illustrating a specific example of the system in FIG. 1A, according to one embodiment. Device #1 providing audio service 163 and device #2 providing screen service 167 may be registered with mashup service server 153. Client 157 may send a request for searching a mashup service TV 155. Upon receiving the request, the mashup service server 153 may send proximity server 151 a request for proximity information for client 157. The proximity server 151 may determine the proximity information based on the registration information or a service discovery through wireless connection. The proximity information may include a list of available devices (Device #1 and Device #2) in proximity to client 157. Based on the proximity information, the mashup service server 153 may determine the mashup service TV 155 interoperable with Device #1 and Device #2. Then the mashup service server 153 may generate TV agent 159 for the mashup service TV 155. The TV agent 159 may include user interface for client 157 and software for operation of Device #1 and Device #2. The TV agent 159 may be sent or downloaded to the client 157 for installation. Then, TV agent 159 capable of controlling Device #1 and Device #2 can start the mashup service TV 155 by playing video through the screen service 167 and audio through the audio service 163.

Figure 1C:
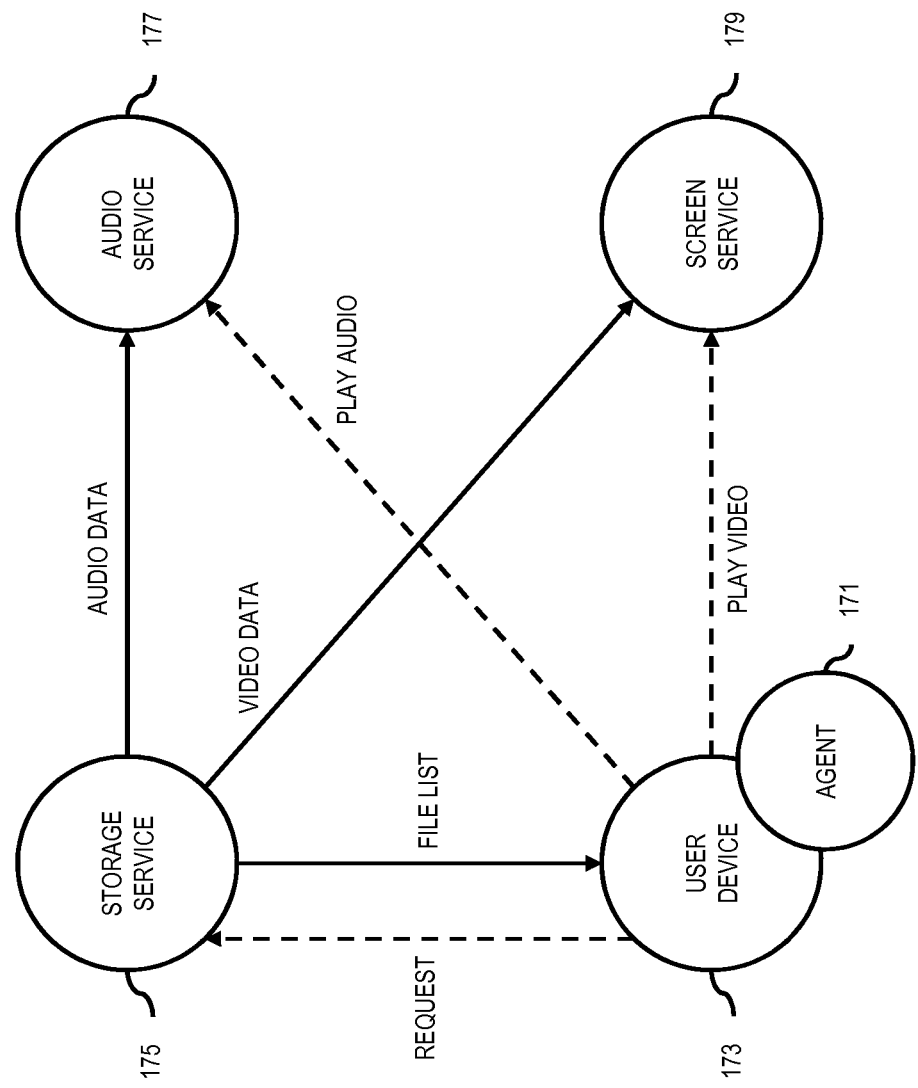
FIGS. 1C-1D are diagrams illustrating simplified examples of the system in the FIG. 1A, according to various embodiments.
Figure 1D:
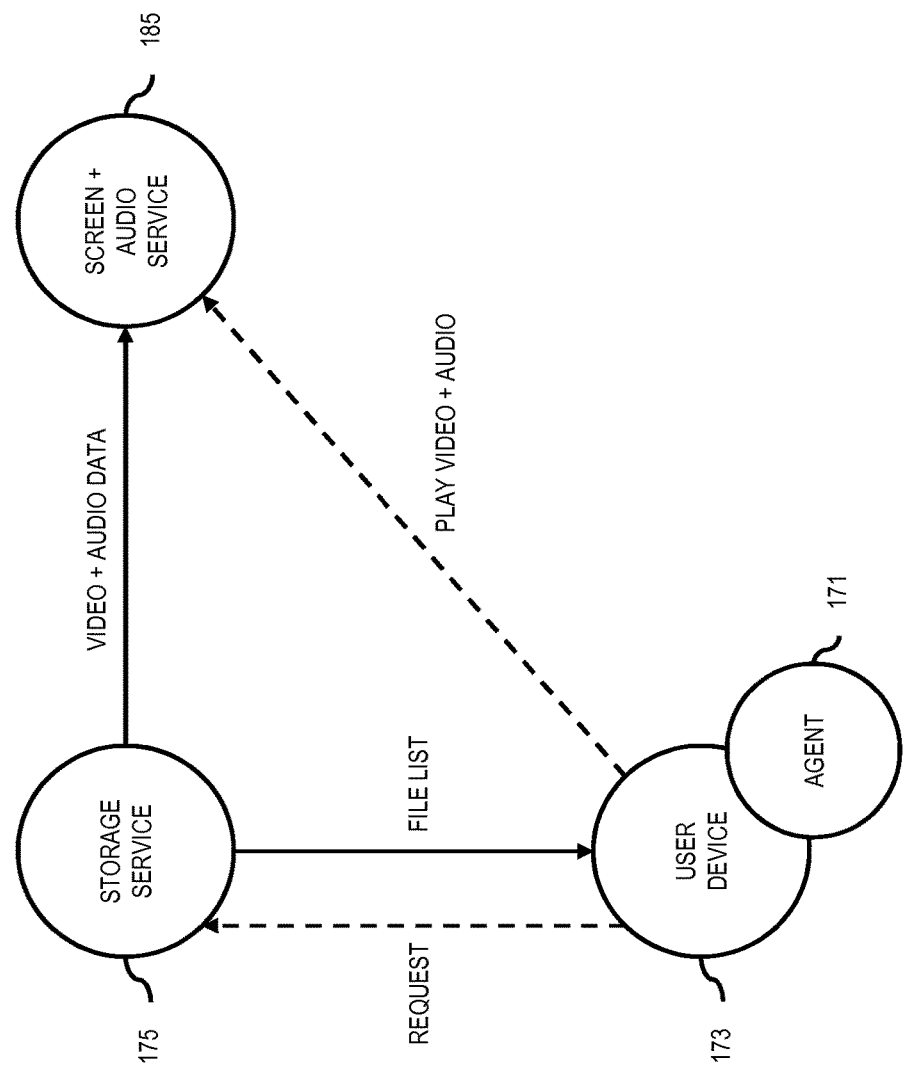

FIGS. 1C-1D are diagrams illustrating simplified examples of the system in the FIG. 1A, according to various embodiments. The dotted lines depict control flow and solid lines depict data flow. The agent 171 associated with the user device 173 performs controlling and orchestrating the mashup service consisting of a storage service 175, an audio service 177, and a screen service 179. The agent 171 abstracts the individual component services and the logic to compose the mashup service, and the audio service 177 and screen service 179 may be combined to a single service (screen+audio service 185) as shown in FIG. 1D without affecting the functionality offered by the mash-up service TV 155. In FIG. 1C, the user device 173 requests file lists from the storage service 175 through the agent 171. Upon receiving the request, the storage service determines or generates a files list based on the request and send the list file list to the user device 173 in a response. The storage service may transmit the audio data to the audio service 177 and video data to the screen service 179 when the storage service 175 sends the file list to user device 173 or when the user device 173 makes another request for the transmission of the audio data and the video data. Then, the user device 173 can send play audio command to the audio service 177 and play video command to the screen service 179 via the agent 171 which contains user interfaces and software logics for controlling the audio service 177 and the video service 179.

FIG. 1D is similar to FIG. 1C. Here, the screen service 179 and audio service 177 of FIG. 1C are combined into screen+audio service 185. Thus, the storage service 175 send one stream of data containing the audio data and video data to the screen+audio service 185 instead of separate data transmission to the audio service 177 and the screen service 179. Also, the TV agent 171 associated with the user device 173 sends one control command including the play video and play audio commands instead of separate comments to each service.

Figure 2B:
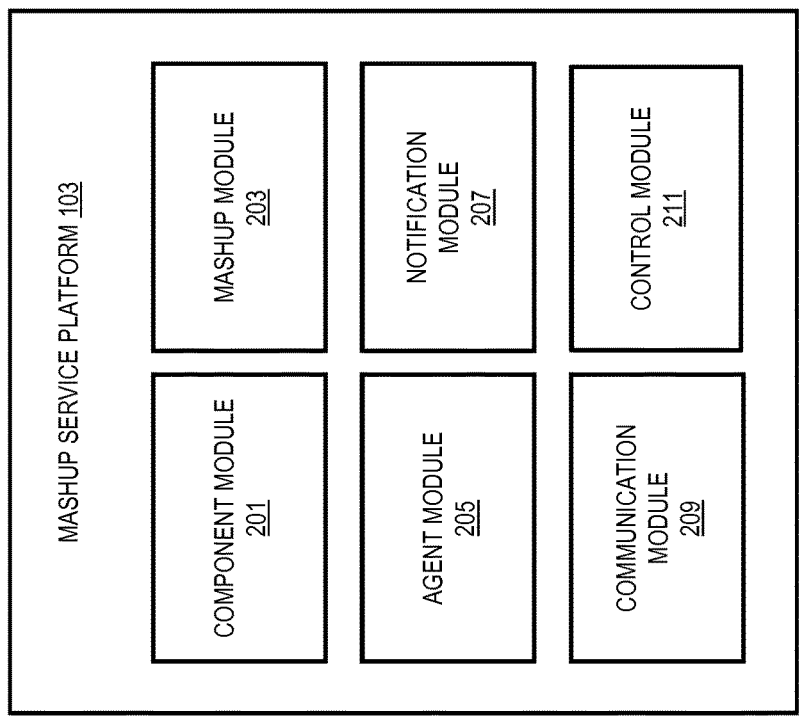
FIGS. 2A and 2B are diagrams of the components of a mashup service platform and a client, respectively, according to one embodiment.
Figure 2A:
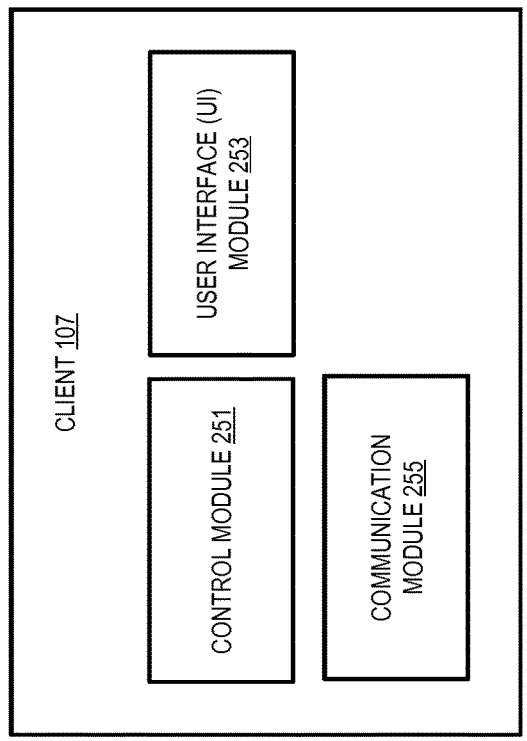

FIG. 2A is a diagram of the components of the mashup service platform 103, according to one embodiment. By way of example, the mashup service platform includes one or more components for providing mashup service of component services. It is contemplated that the functions of these components may be combined in one or more components or performed by other components of equivalent functionality. In this embodiment, the mashup service platform includes a component module 201, a mashup module 203, an agent module 205, a notification module 207, a communication module 209, and control module 211.

In one embodiment, the component module 201 may enable registration of the component services 109. The registration may involve storing in a server registration information including proximity information, connectivity information, service interface specifications, parameters, other functional and non-functional specifications etc. for using the component services. The component module 201 may also determine the available component services 109 in the proximity based on the proximity information.

In one embodiment, the mashup module 203 may determine the mashup services based on a combination of component services 109. In determining the mashup services, the mashup module 203 may determine the specifications for the mashup service and whether the component services satisfy the specifications. The mashup module may also generate mashup agent 111 for interfacing with the mashup service and the component services. In generating mashup agent 111, the mashup module 203 may also determine software (e.g., logics, interfaces, layers, programs, etc.) to be included in the mashup agent 111.

In one embodiment, the mashup module 203 may send the mashup agent 111 (determined by the mashup module 203) to the UE 101 upon a request to download or install the mashup agent 111. The agent module 205 may maintain the mashup agents 111 in servers and allow accesses to the mashup agents 111. The mashup agents may be updated or modified upon any changes on the component services.

In one embodiment, the notification module 207 may present notifications that the mashup service is available based on availability of the component services to UE 101. The notifications may include push or pop-up notifications, sound or vibration notification, etc.

In one embodiment, the communication module 209 may enable connections and data transmissions between the mashup service platform 103 and the UE 101, the component services 109, or the mashup agents 111 via the communication network 105.

In one embodiment, the control module 211 executes at least one algorithm for executing functions of the mashup service platform 103. The component module 201 may also execute an algorithm to interact with other components of the mashup service platform 103, such as component module 201, mashup module 203, agent module 205, notification module 207, and communication module 209. Further, the control module 211 may execute an algorithm to interact with the client 107.

FIG. 2A is a diagram of the components of the client 107, according to one embodiment. By way of example, the client 107 includes one or more client side components for providing mashup service of component services. It is contemplated that the functions of these components may be combined in one or more components or performed by other components of equivalent functionality. In this embodiment, the client 107 includes a control module 251, a user interface (UI) module 253, and a communication module 255.

In one embodiment, the control module 251 oversees the tasks, including tasks performed by the user interface (UI) module 253 and the communication module 255. For example, although the other modules may perform the actual task, the control module 251 may determine when and how these tasks are preformed or otherwise direct the other modules to perform the task.

Figure 4A:
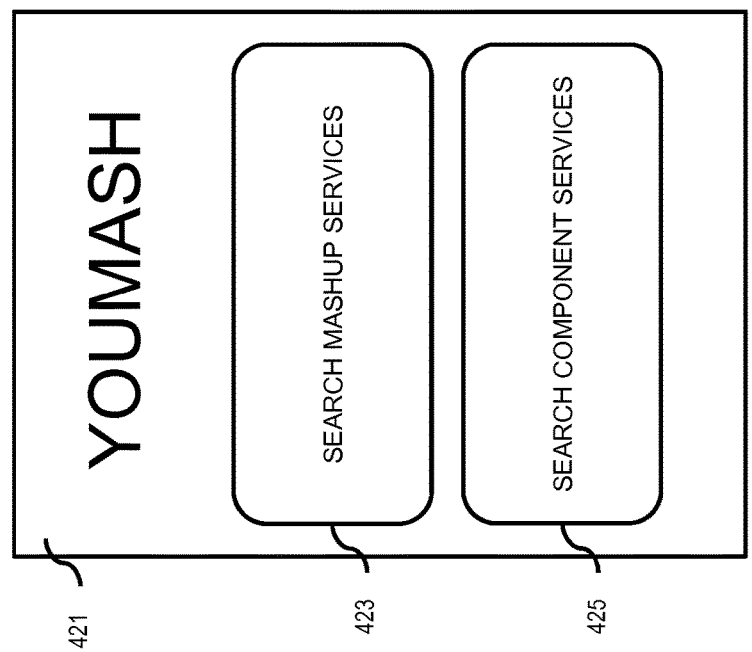
FIGS. 4A-4C are diagrams of user interfaces utilized in the processes of FIG. 3A-3D, according to various embodiments.
Figure 4A:
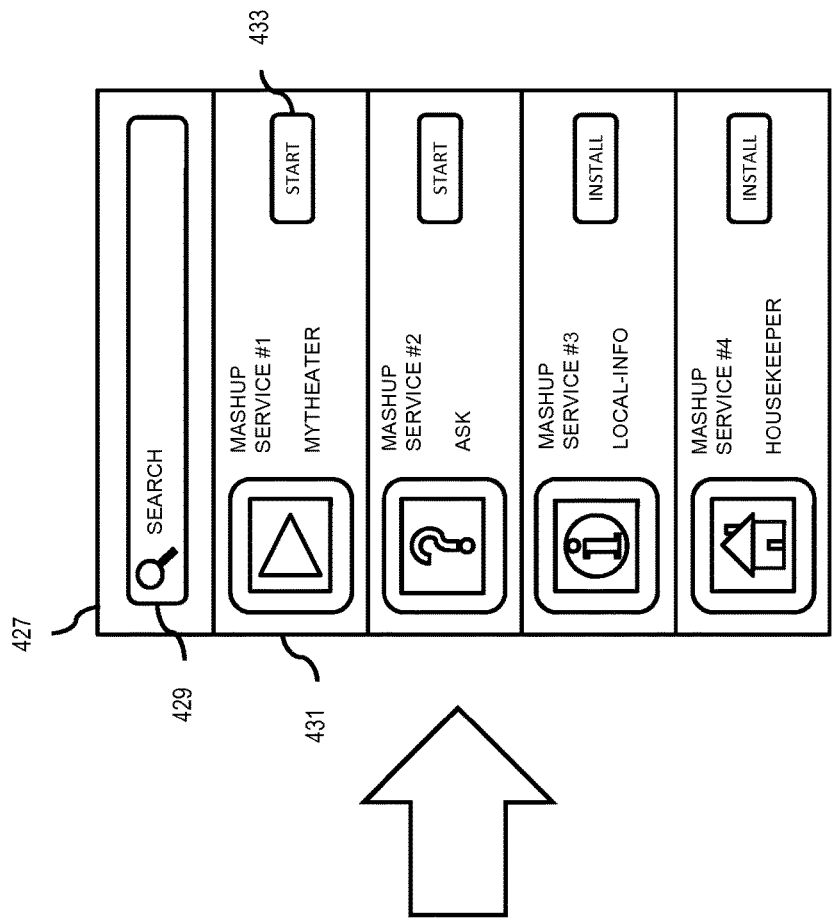
Figure 4B:
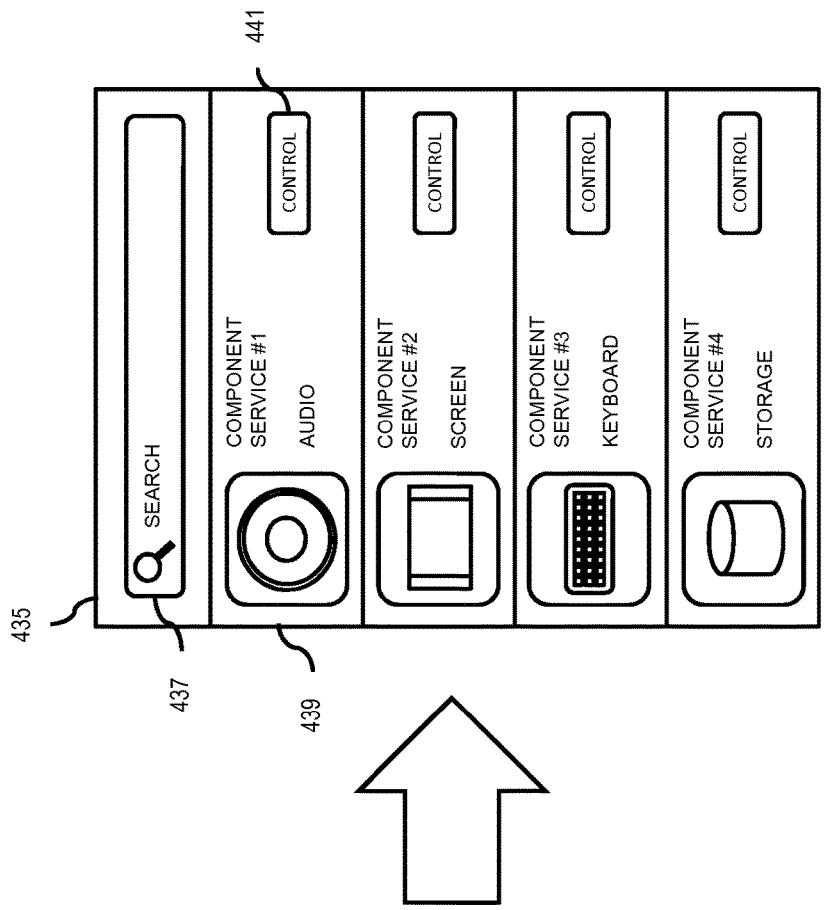
Figure 4B:
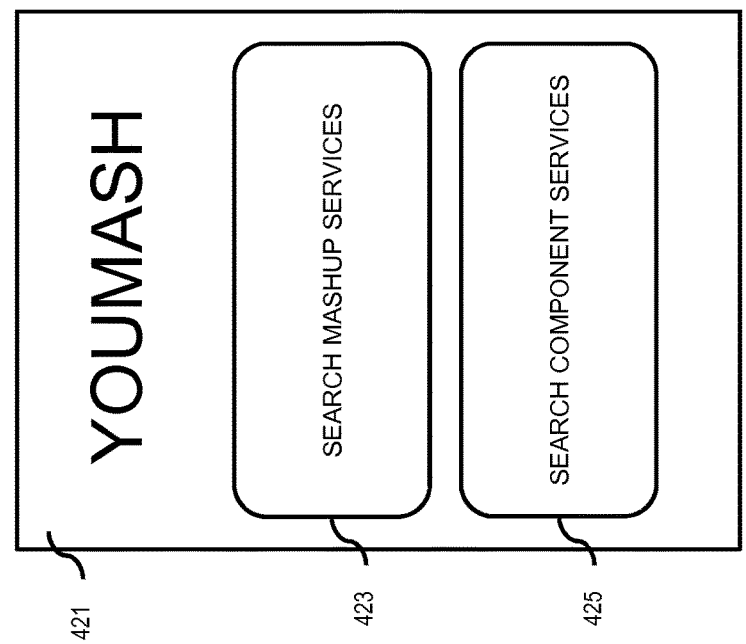
Figure 4C:
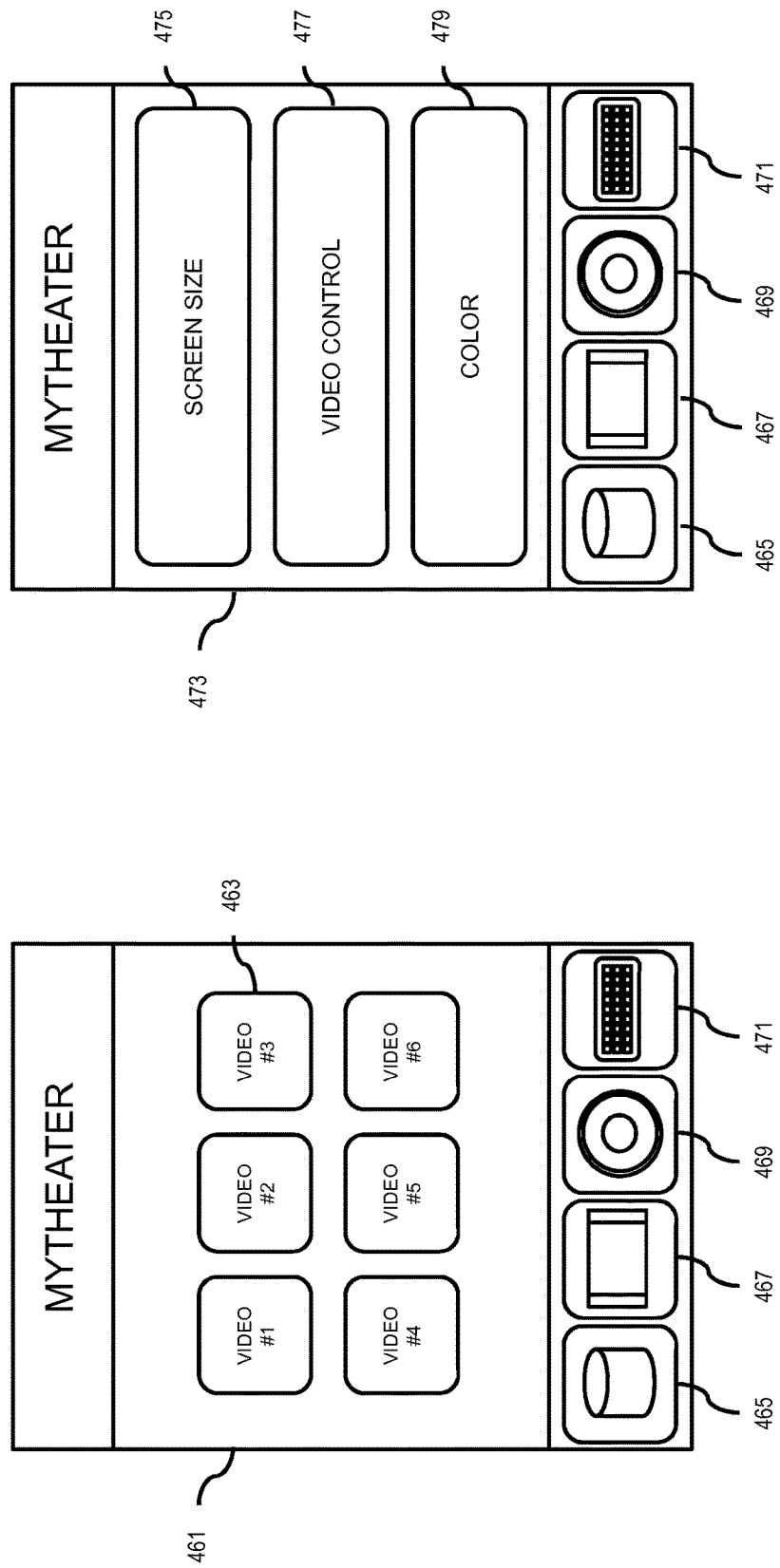

In one embodiment, the user interface (UI) module 253 interacts with the mashup service platform 103 in a client-server relationship to cause a rendering of a user interface for providing the mashup service of the component services. Illustrative examples of the user interfaces rendered by the user interface module 253 are shown in FIGS. 4A-4C.

In one embodiment, the communication module 255 is used for communication between the mashup service platform 103 and the client 107 of the UEs 101. The communication module 255 may be used to communicate commands, requests, data, etc.

Figure 7:
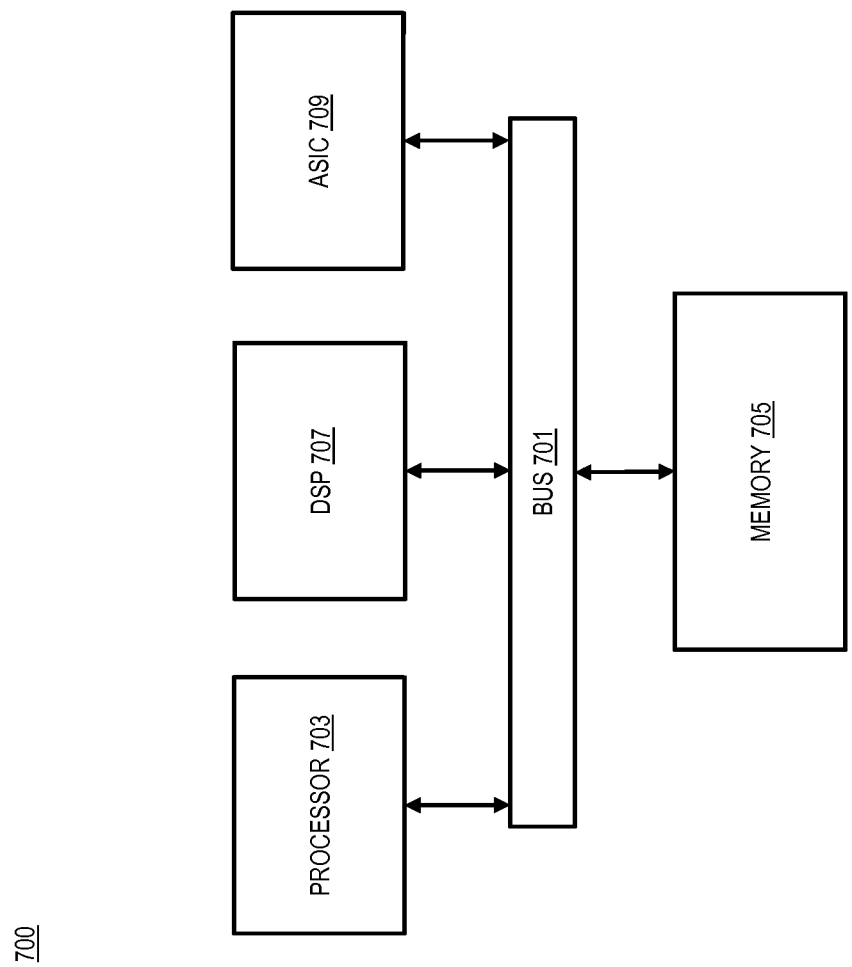
FIG. 7 is a diagram of a chip set that can be used to implement an embodiment of the invention.

FIGS. 3A-3D are flowcharts of processes for providing mashup service of component services, according to one embodiment. In various embodiments, the mashup service platform 103 performs the processes 300, 330 and 360, and is implemented in, for instance, a chip set including a processor and a memory as shown in FIG. 7.

Figure 3A:
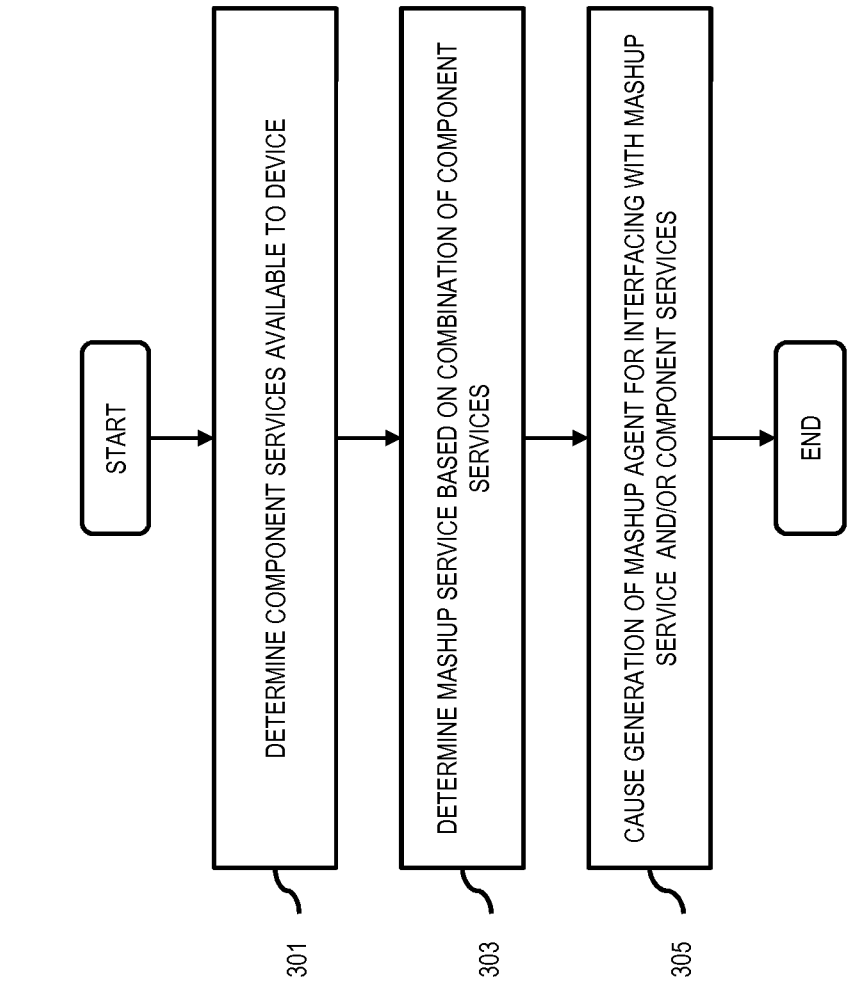
FIGS. 3A-3D are flowcharts of processes for providing mashup service of component services, according to one embodiment.

FIG. 3A is a flowchart of the process 300 for generating a mashup agent for a mashup service. In step 301, the mashup service platform 103 may determine component services available to a device. The component services may be web-based services (e.g., mapping services, video streaming services, encyclopedia service, etc.) or local services (e.g., video screening on TV, audio playing on speakers, data storing on a server, etc.). The devices may be capable of providing the component services and may use at least one connectivity technique (e.g., LAN, WAN, WiFi, Bluetooth, short-range radio, uPnP, cellular, etc.). Based on the one or more component services, a mashup service may be determined (step 303). For example, based on connectivity, specifications, availability, etc. of the component services, the mashup service that satisfies the connectivity, the specifications, the availability, etc. may be determined from the mashup services that are currently available or to be generated. Then, a generation of a mashup agent for interfacing with the mashup service, the component services, or a combination thereof may be caused (step 305). The mashup agent may be an application used for interfacing between the device and the service components or the mashup service platform 103. The mashup agent may be a web-based application installed in a server or a mobile application downloadable to the user equipment. In that way, the mashup agent for the mashup service can be generated.

Figure 3B:
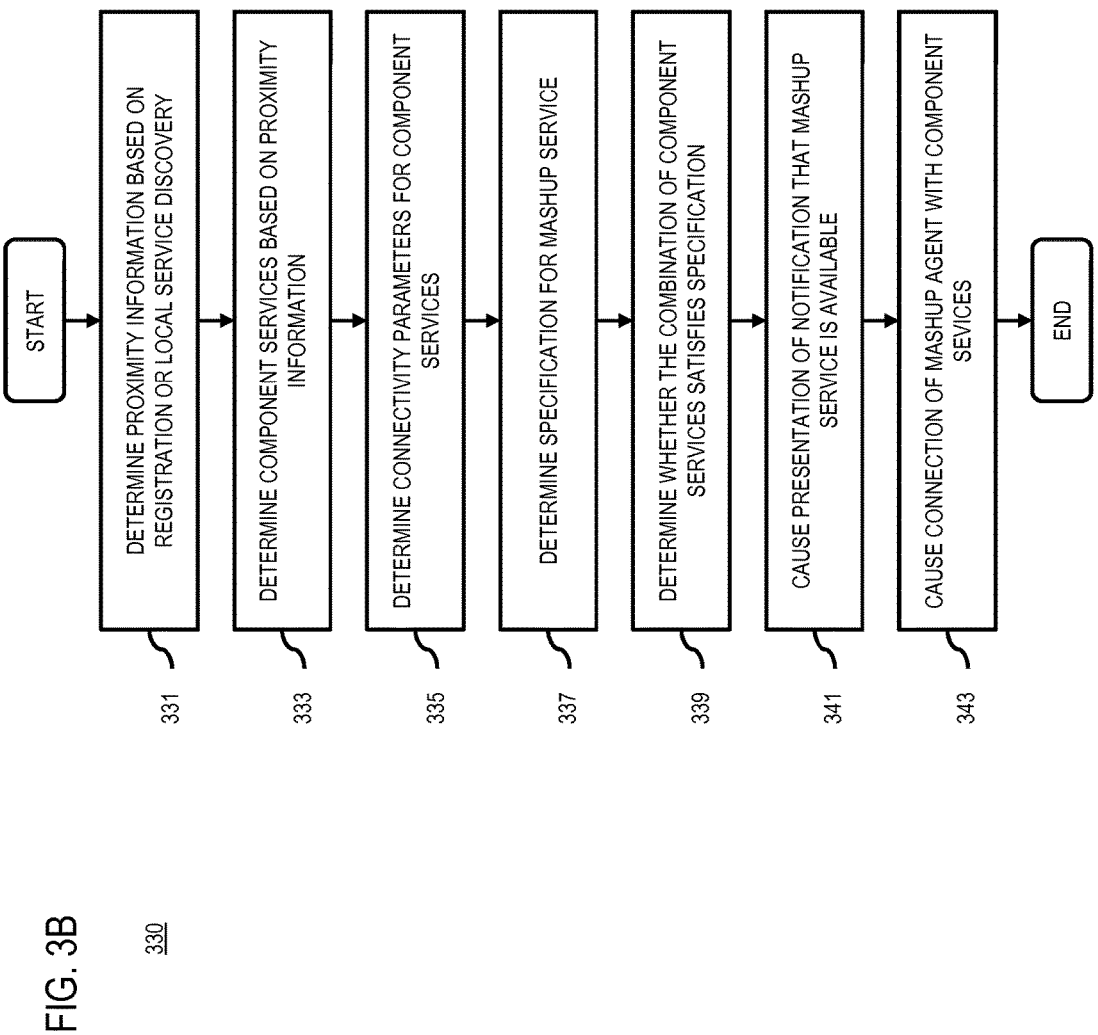

FIG. 3B is a flowchart of the process 330 for connecting a mashup agent with component services. In step 331, the mashup service platform 103 may determine proximity information based, on (a) a registration of component services, the other devices providing the component services, or a combination thereof; (b) a local service discovery through local wireless connections; or (c) a combination of (a) and (b) (step 333). The proximity information may include distances or connectivity between the device and the component services or the other devices. The registration may involve storing in a server registration information including proximity information, connectivity information, specifications, parameters, etc. for using the component services. The local service discovery may be a search of signal for the local connections (e.g., Bluetooth, WiFi, uPnP, shot-range radio, etc.). Based on the proximity information between the device and the component services, the other devices, or a combination thereof, the component services may be determined (step 333). For example, the mashup service platform 103 may determine the component services in close distances and having a strong service connection. In step 335, connectivity parameters for the component services may be determined. The connectivity parameters may be values and logics used in exchange of protocols between the device and the other devices or the component services while making the connections. In step 337, specifications for the mashup component services for providing the mashup service may be determined. The specifications maybe include processor speed, connectivity technique, memory size, operating system type, display technique, sensor information, language support, environmental requirements, service descriptions, interface specifications, etc. Whether the combination of the component services substantially satisfies the specifications may be determined to cause the determining of the mashup service, the generation of the mashup agent, or a combination thereof (step 339). For example, the mashup platform may determine the component services with reliable processor speed and connectivity techniques to provide reliable mashup services without delays or interruptions.

In step 341, a presentation of a notification that the mashup service is available may be caused based on the component services available to the device. The notification may be in forms of pop-up messages, push notifications, etc. Then, a connection of the mashup agent with the component services through a communication layer of the mashup agent may be caused (step 343). The communication layer may be a software module or a device that enable the mashup agent to make a connection with the component services. In that way, the mashup agent can connect with the component services.

Figure 3C:
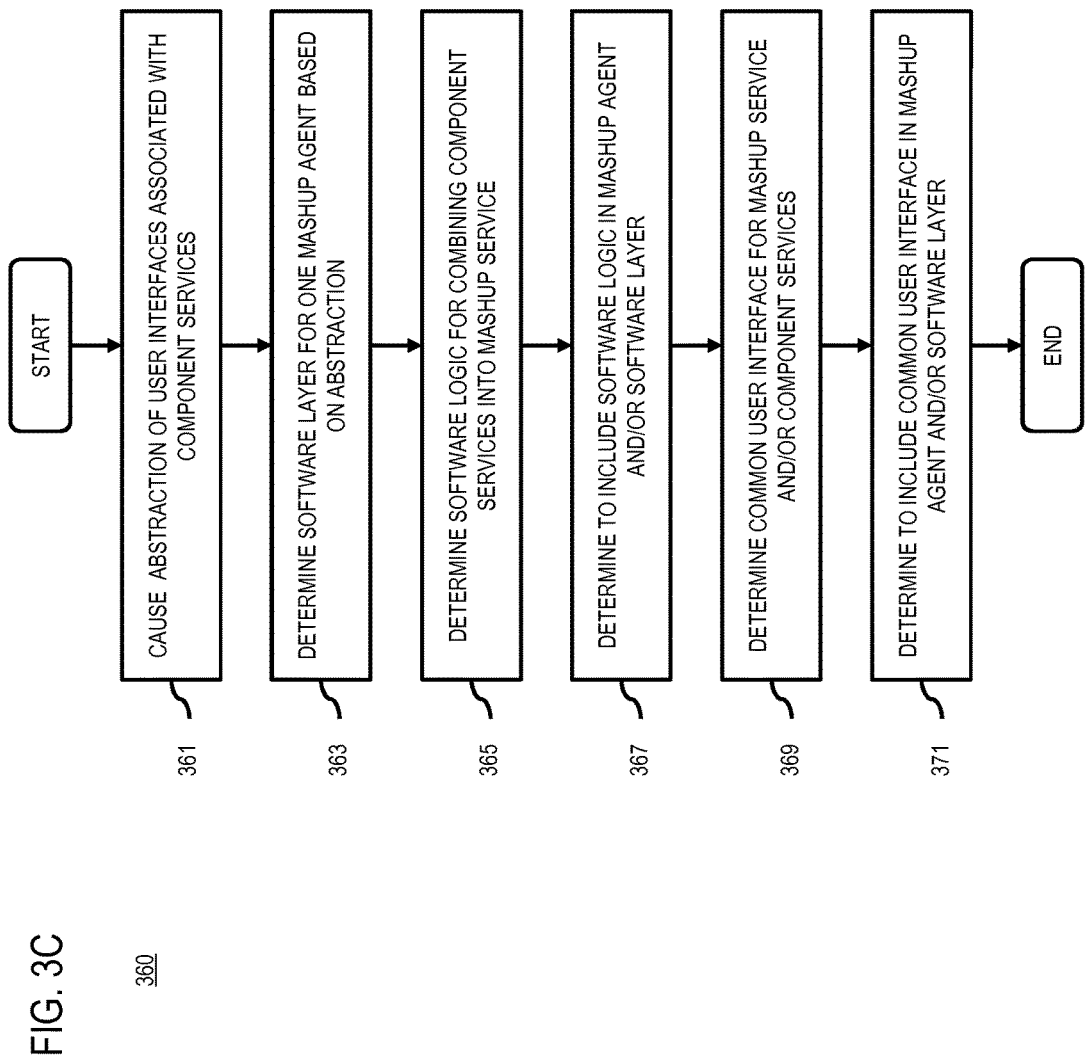

FIG. 3C is a flowchart of the process 360 for including a common user interface and a software logic in a mashup agent and/or a software layer. In step 361, the mashup service platform 103 may cause abstraction of user interfaces associated with component services. The abstraction of the user interface may be a process by which data and programs of the user interfaces are defined with a representation similar in form to its meaning while hiding the implementation details. Based on the abstraction, a software layer for the mashup agent may be determined (step 363). The software layer may be a software module or an application programmed based on the abstraction for the operation of the mashup services.

In step 365, software logic for combining the component services into the mashup service may be determined. The software logic may include rules, formulas, calculations, etc. to be used in combining the component services. The software logic may be determined to be included in the mashup agent, the software layer, or a combination thereof (step 367). The software logic included in the mashup agents and the software layer may facilitate interoperability between the device associated with the mashup agents and the component services 109.

In step 369, a common user interface for the mashup service, the component services, or a combination thereof may be determined based on the abstraction. The common user interface may enable communications and controls of the component services 109 consists the mashup service. The common user interface may be determined to be included in the mashup agent, the software layer, or a combination thereof (step 371). The common user interface included in the mashup agents and the software layer may facilitate interoperability between the device associated with the mashup agents and the component services 109. In that way, the common user interface and the software logic can be included in the mashup agent and/or software layer.

Figure 3D:
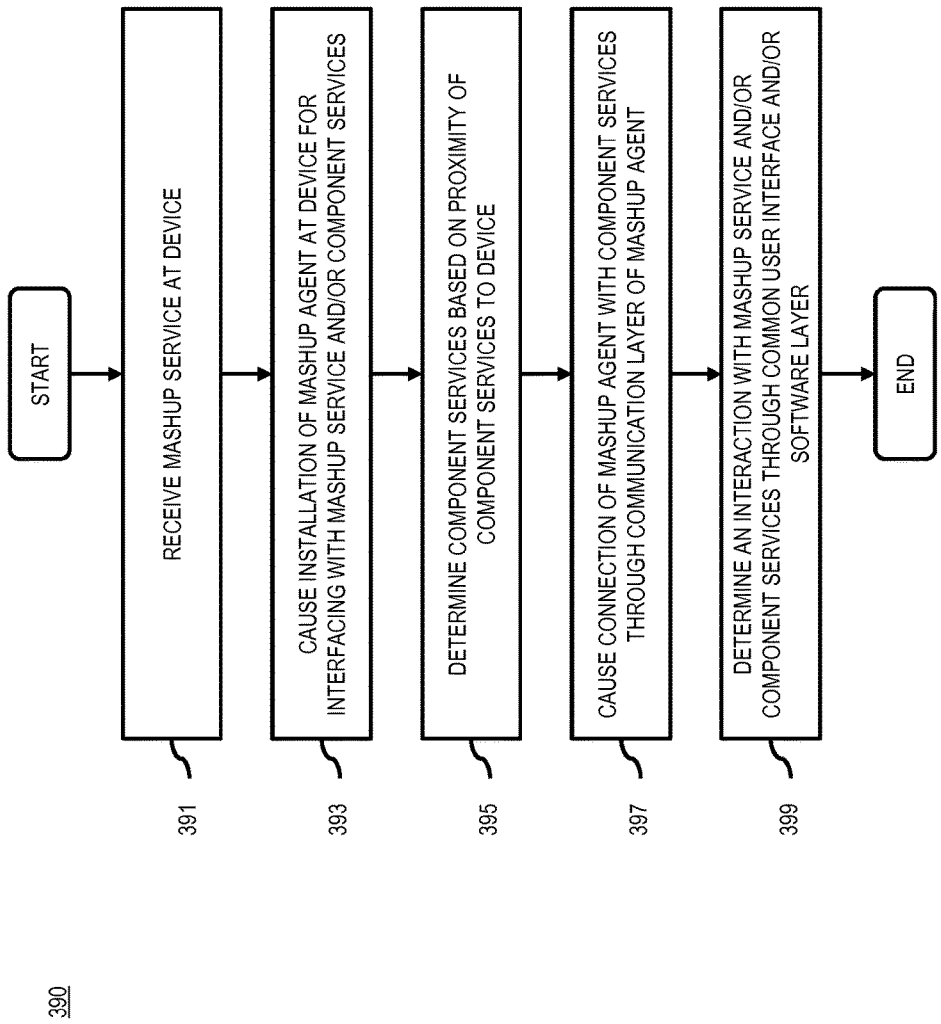

In various embodiments, the UEs 101 performs the processes 390, and is implemented in, for instance, a chip set including a processor and a memory as shown in FIG. 7. FIG. 3D is a flowchart of the process 390 for interacting with a mashup service and/or component services.

In step 391, the UEs 101 may receive a mashup service at a device. The UEs 101 may send a request for a search of a mashup service to the mashup service platform 103. The mashup service platform 103 may return a result of the search containing available mashup services. The mashup services may be determined based on component services available (e.g., available in a proximity) to the device. Then, the UEs 101 may select one of the available mashup services from the result and receive/download a mashup agent for the mashup service. By way of example, a user may search available mashup services around the user on a user terminal by connecting to a mashup services search service. The user may select one of the available mashup services and download the mashup agent (e.g., an application, a plug-in, an adapter, etc.) for the selected mashup service.

In step 393, the UEs 101 may cause an installation of a mashup agent at the device for interfacing with the mashup service and/or the component services. The mashup agent may be installed to the device as it is being downloaded to the device or after the downloading. The mashup agent may be configured to interface with the mashup services as well as the component services of the mashup services. By way of example, the mashup agent may be installed into the user terminal automatically as the user selects to receive the mashup service. Otherwise, the user may be asked to download and/or install the mashup agent when the user selects to receive the mashup service.

In step 395, the UEs 101 may determine the component services based on a proximity of the component services to the device. The UEs 101 may determine proximity information based, on (a) a registration of component services, the other devices providing the component services, or a combination thereof; (b) a local service discovery through local wireless connections; or (c) a combination of (a) and (b). The proximity information may include distances or connectivity between the device and the component services or the other devices. The registration may involve storing in a server registration information including proximity information, connectivity information, specifications, parameters, etc. for using the component services. The local service discovery may be a search of signal for the local connections (e.g., Bluetooth, WiFi, uPnP, shot-range radio, etc.). Based on the proximity information between the device and the component services, the other devices, or a combination thereof, the component services may be determined (step 333). For example, the UEs 101 may determine the component services in a close distance and/or having a strong connectivity signal.

In step 397, the UEs 101 may cause a connection of mashup agent with the component services through a communication layer of the mashup agent. The communication layer may be a software module or a device that enables connections and data transmissions between the UE 101, the mashup service platform 103, and the component services 109 via the communication network 105.

In step 399, the UEs 101 may determine an interaction with the mashup service and/or component services through a common user interface and/or a software layer. The common user interface may enable communications and controls of the component services 109 consists the mashup service. The software layer may be a software module or an application programmed based on an abstraction for the operation of the mashup services. The abstraction may be a process by which data and programs of the user interfaces are defined with a representation similar in form to its meaning while hiding the implementation details. Further, the common user interface and/or software layer may be included in the mashup agent. The common user interface included in the mashup agents and the software layer may facilitate interoperability between the devices associated with the mashup agents and the component services 109. In that way, the UEs 101 can interact with the mashup service and/or component services.

FIGS. 4A-4C are diagrams of user interfaces utilized in the processes of FIG. 3A-3D, according to various embodiments. As shown in FIG. 4A, the initial page 421 may display an option to search mashup services 423 and another option to search component services 425. A user's selection of the option to search mashup services may lead to mashup service search page 427. The mashup service search page 427 may include a mashup service search bar 429 and a list of mashup service entries 431. The mashup service search bar 429 may allow users to input keywords to search the mashup services. The mashup service entry 431 may include description of the mashup service and a button 433. The button 433 may either starts the mashup service or installs a mashup service application (or mashup agent 111) in case the mashup service is not installed.

As shown in FIG. 4B, a user selection of another option to search component services may lead to component service search page 435. The component service search page 435 may include a component service search bar 437 and a list of component service entry 439. The component service search bar 437 may allow users to input keywords to search the component services. The mashup service entry 431 may include description of the component service and a button 441. The button 411 may either launches detailed information about the component service or a control panel for the component service.

FIG. 4C is an example of the mashup service ("MyTheater") selected from the mashup search page 427. MyTheater is consisted of four local component services, which are a storage service 465, a screen service 467, an audio service 469, and a keyboard service 471. MyTheater enables access and utilization of the component services. Upon selecting the storage service 465, a storage service interface 461 is displayed. The storage service interface 361 presents the contents (e.g., movie, audio, pictures, etc.) 463 in a storage device and allow users to select from the contents. Further, upon selecting the screen service 467, a screen service interface 473 is displayed. The screen service interface 473 allows users to control video by providing video control option 477 or adjust screen settings by providing screen size option 475 and a color setting option 479. Other component services such as the audio service 469 and the keyboard service 471 may present interfaces and features according to their configuration with the mashup service. For example, if a user selects a content 463 from the storage service interface 461, the content may be played by the video control 477 in the screen service interface 473 and the screen setting may be adjusted bases on the user's selection of the options. In addition, through the audio service 469, the audio content from the storage service 465 may be transmitted to the user's home theater system and played. Lastly, the keyboard service 471 may enable users to navigate through the mashup service or input texts while using the mashup service. The component services in MyTheater may be interconnected via Wi-Fi, Bluetooth, short-range radio, etc.

Figure 5:
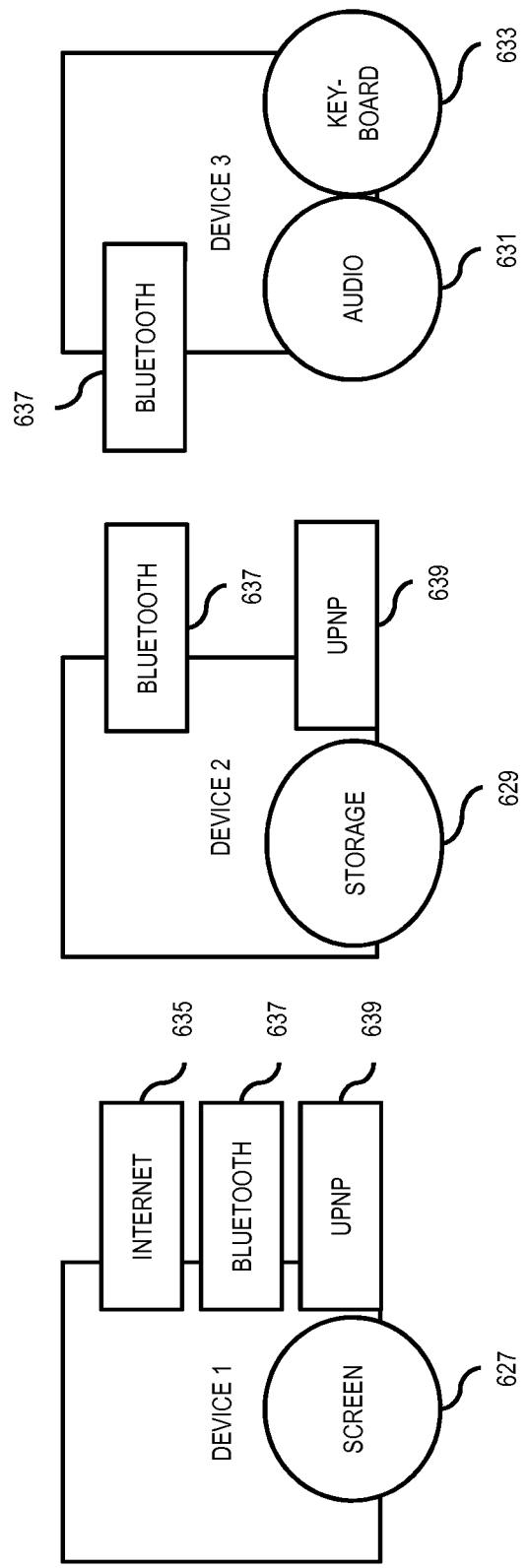
FIG. 5 is a diagram illustrating service registration of different devices with different connectivity techniques, according to one embodiment.

FIG. 5 is a diagram illustrating service registration of different devices with different connectivity techniques. Device 1 has internet connectivity 535 and thus, can register a screen service 527 with the mashup service server. Device 1 can perform service discovery in the local area via Bluetooth connectivity 537 or uPnP 539 and report to the mashup service server found local component services such as a storage service 529 associated with Device 2 and an audio service 531 and a keyboard service 533 associated with Device 3. In this way, the mashup service can be consisted of services associated with devices that do not have internet connectivity. The processes described herein for providing mashup service of component services may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
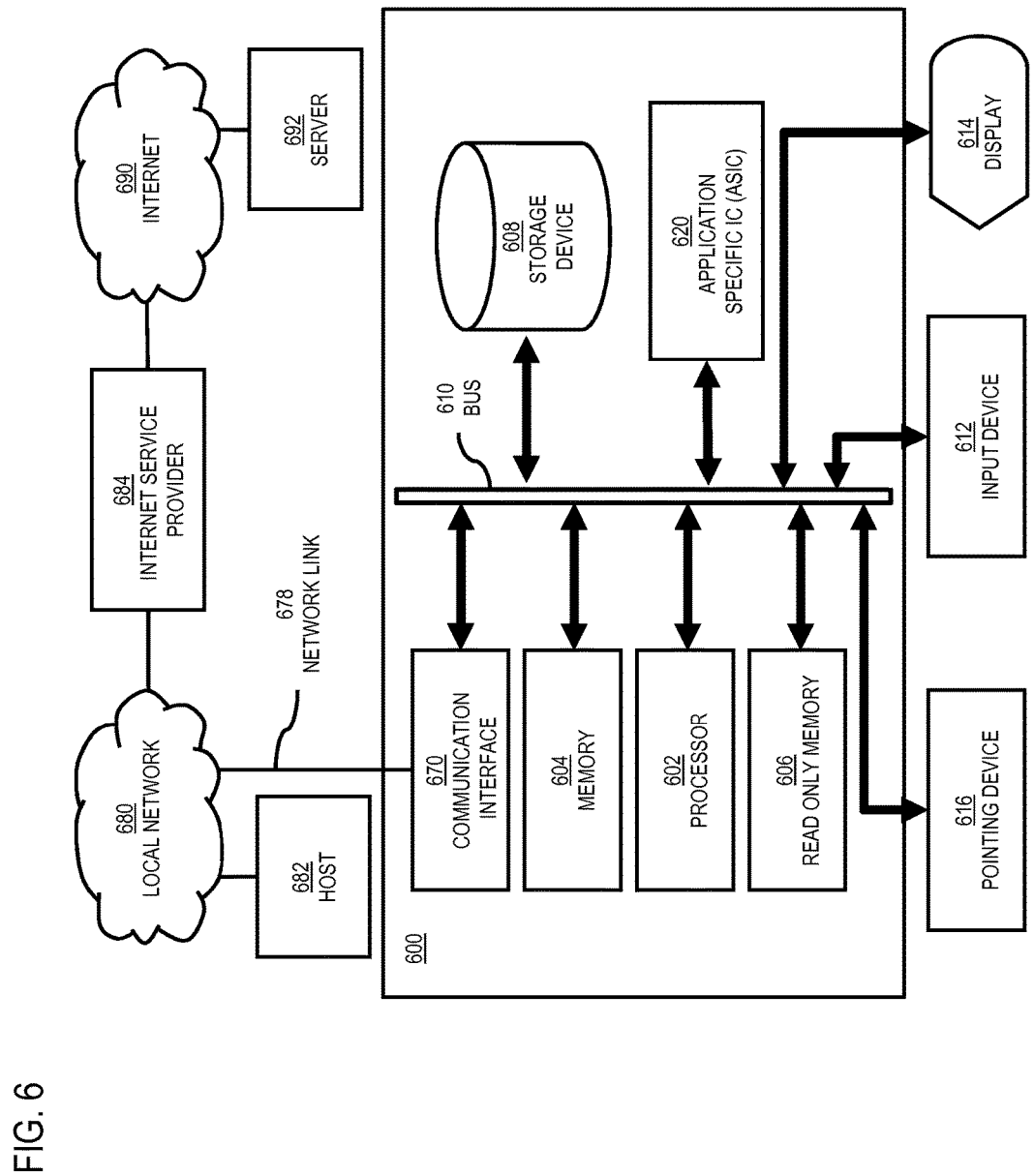
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide mashup service of component services as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing mashup service of component services.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to provide mashup service of component services. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for providing mashup service of component services. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing mashup service of component services, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing mashup service of component services to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to provide mashup service of component services as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of providing mashup service of component services.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide mashup service of component services. The memory 705 also stores the data associated with or generated by the execution of the inventive steps.

Figure 8:
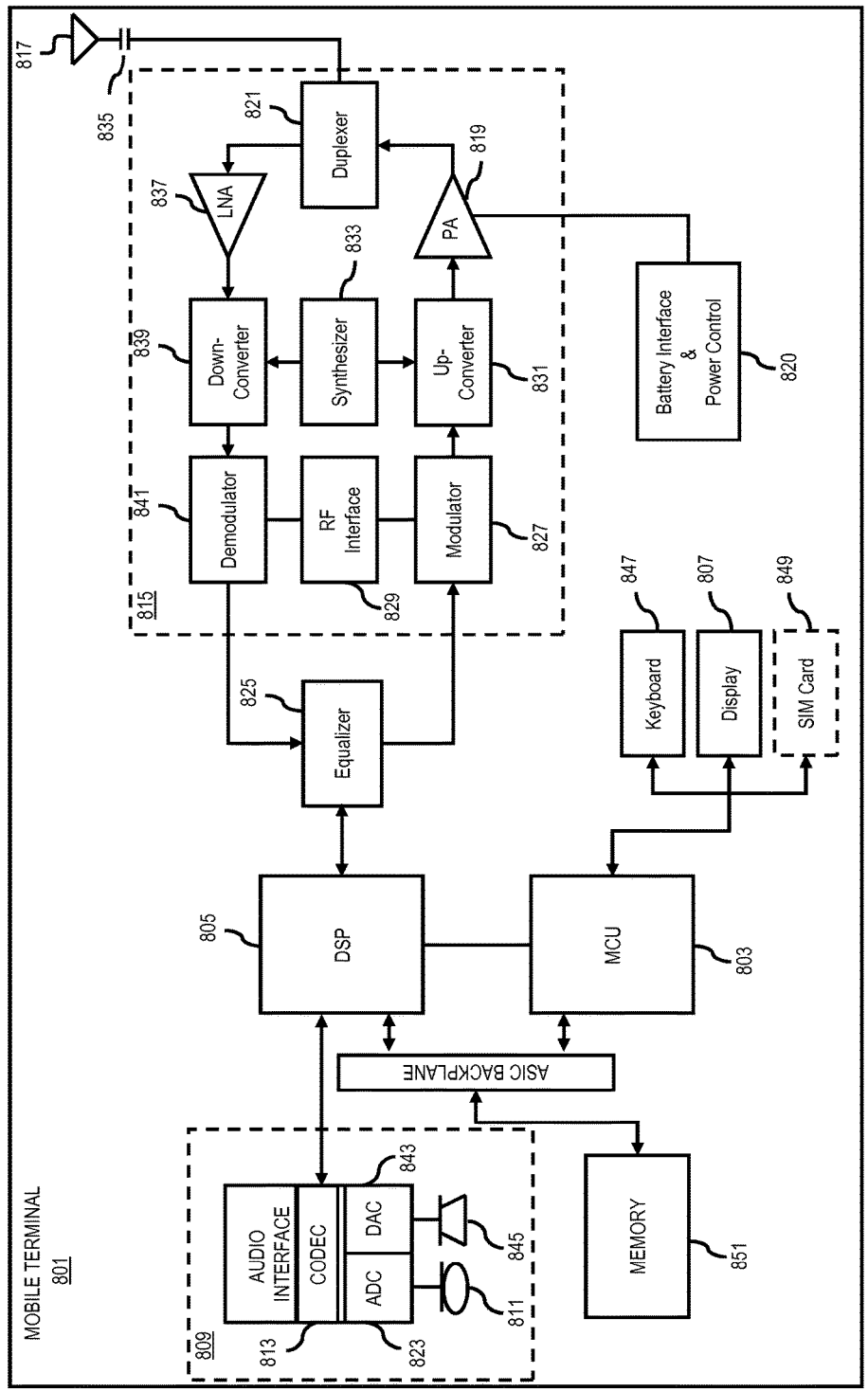
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of providing mashup service of component services. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing mashup service of component services. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide mashup service of component services. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing, via a mashup service platform, mashup services, the method comprising:
   determining one or more component services available to at least one device, wherein the determination of the one or more component services comprises determining proximity information between the at least one device, one or more component services, one or more other devices, or a combination thereof, the one or more other devices configured to provide the one or more component services to the at least one device;
   determining, with at least one processor, at least one mashup service based on a combination of the one or more component services satisfying one or more specifications for the at least one mashup service, wherein the one or more specifications comprise at least processor speed, memory size, operating system type, connectivity technique, or sensor information;

receiving a request for the at least one mashup service from the at least one device;

in response to receiving the request, generating at least one mashup agent for interfacing with the at least one mashup service, the one or more component services, or a combination thereof;

providing the at least one mashup agent to the at least one device so as to facilitate interoperability between the at least one device and the at least one mashup service, the one or more component services, or a combination thereof via the at least one mashup agent;

abstracting one or more user interfaces associated with the one or more component services;

determining at least one software layer for the at least one mashup agent based on the abstraction, wherein the at least one software layer is an application programmed based on the abstraction for operation of the at least one mashup service;

creating at least one common user interface for the at least one mashup service, the one or more component services, or a combination thereof based on the abstraction; and determining to include the at least one common user interface in the at least one mashup agent, the at least one software layer, or a combination thereof.

2. The method of claim 1, further comprising determining one or more connectivity parameters for the one or more component services; and connecting the at least one mashup agent with the one or more component services through at least one communication layer of the at least one mashup agent.

3. The method of claim 1, further comprising:

determining software logic for combining the one or more component services into the at least one mashup service; and determining to include the software logic in the at least one mashup agent, the at least one software layer, or a combination thereof.

4. The method of claim 1, further comprising:

determining the one or more component services based on the proximity information between the at least one device and the one or more component services, the one or more other devices providing the one or more component services, or the combination thereof.

5. The method of claim 4, further comprising determining the proximity information based on (a) a registration of the one or more component services, the one or more other devices, or a combination thereof; (b) a local service discovery through one or more local wireless connections; or (c) a combination thereof.

6. The method of claim 1, further comprising determining the one or more specifications for the at least one mashup service, wherein the one or more specifications indicate one or more mashup component services for providing the at least one mashup service;

determining whether the combination of the one or more component services corresponds to the one or more specifications to cause the determining of the at least one mashup service, the generation of the at least one mashup agent, or a combination thereof.

7. The method of claim 1, wherein the one or more component services include one or more internet services, one or more local services, or a combination thereof.

8. A method for receiving, via at least one device, mashup services, the method comprising:

receiving at least one mashup service at the at least one device, wherein the at least one mashup service is based on one or more component services available to the at least device, wherein the one or more component services is determined based on proximity information between the at least one device, one or more component services, one or more other devices, or a combination thereof, the one or more other devices configured to provide the one or more component services to the at least one device;

installing, with at least one processor, at least one mashup agent at the at least one device for interfacing with the at least one mashup service, the one or more component services, or a combination thereof, the at least one mashup agent facilitating interoperability between the at least one device and the at least one mashup service, the one or more component services, or a combination thereof via the at least one mashup agent; and determining an interaction with the at least one mashup service, the one or more component services, or a combination thereof through at least one common user interface, at least one software layer, or combination thereof, wherein the at least one common user interface, the at least one software layer, or combination thereof are determined based on an abstraction of one or more user interfaces associated with the one or more component services, wherein the at least one software layer is an application programmed based on the abstraction for operation of the at least one mashup service, and wherein the at least one common user interface, the at least one software layer, or combination thereof are included in the at least one mashup agent.

9. The method of claim 8, further comprising:

determining the one or more component services based on a proximity of the one or more component services to the at least one device; and a connection of at least one mashup agent with the one or more component services through at least one communication layer of the at least one mashup agent.

10. An apparatus comprising:

at least one processor; and at least one memory including computer program code for one or more programs, the at least one memory and the computer program code configured to, with the at least one processor, cause the apparatus to perform at least the following, determine one or more component services available to at least one device, wherein the determination of the one or more component services comprises determining proximity information between the at least one device, one or more component services, one or more other devices, or a combination thereof, the one or more other devices configured to provide the one or more component services to the at least one device;

determine at least one mashup service based on a combination of the one or more component services satisfying one or more specifications for the at least one mashup service, wherein the one or more specifications comprise at least processor speed, memory size, operating system type, connectivity technique, or sensor information;

receive a request for the at least one mashup service from the at least one device;

in response to the request, cause a generation of at least one mashup agent for interfacing with the at least one mashup service, the one or more component services, or a combination thereof;

provide the at least one mashup agent to the at least one device so as to facilitate interoperability between the at least one device and the at least one mashup service, the one or more component services, or a combination thereof via the at least one mashup agent;

cause an abstraction of one or more user interfaces associated with the one or more component services;

determine at least one software layer for the at least one mashup agent based on the abstraction, wherein the at least one software layer is an application programmed based on the abstraction for operation of the at least one mashup service;

create at least one common user interface for the at least one mashup service, the one or more component services, or a combination thereof based on the abstraction; and determine to include the at least one common user interface in the at least one mashup agent, the at least one software layer, or a combination thereof.

11. The apparatus of claim 10, wherein the apparatus is further caused to:
   determine one or more connectivity parameters for the one or more component services; and
   cause a connection of the at least one mashup agent with the one or more component services through at least one communication layer of the at least one mashup agent.

12. The apparatus of claim 10, wherein the apparatus is further caused to:
   determine software logic for combining the one or more component services into the at least one mashup service; and
   determine to include the software logic in the at least one mashup agent, the at least one software layer, or a combination thereof.

13. The apparatus of claim 10, wherein the apparatus is further caused to:
   determine one or more component services based on the proximity information between the at least one device and the one or more component services, the one or more other devices providing the one or more component services, or the combination thereof.

* * * * *

UNITED STATES PATENT AND TRADEMARK OFFICE
CERTIFICATE OF CORRECTION

PATENT NO. : 9,798,586 B2  
APPLICATION NO. : 13/646794  
DATED : October 24, 2017  
INVENTOR(S) : Leppanen et al.

Page 1 of 1

It is certified that error appears in the above-identified patent and that said Letters Patent is hereby corrected as shown below:

In the Claims

Column 21,
Line 28, "comprising" should read --comprising:--.
Line 47, "comprising" should read --comprising:--.
Line 53, "comprising" should read --comprising:--.

Column 22,
Line 4, "least" should read --least one--.

Signed and Sealed this
Nineteenth Day of June, 2018

Andrei Iancu
*Director of the United States Patent and Trademark Office*